US008953765B2

(12) United States Patent
O'Connor et al.

(10) Patent No.: US 8,953,765 B2
(45) Date of Patent: *Feb. 10, 2015

(54) CALL PRIORITIZATION METHODS IN A CALL CENTER

(75) Inventors: Neil O'Connor, Lackagh (IE); Tony McCormack, Galway (IE)

(73) Assignee: Rockstar Consortium US LP, Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/523,399

(22) Filed: Jun. 14, 2012

(65) Prior Publication Data

US 2012/0252528 A1 Oct. 4, 2012

Related U.S. Application Data

(63) Continuation of application No. 11/577,472, filed as application No. PCT/EP2005/055379 on Oct. 19, 2005, now Pat. No. 8,229,100.

(51) Int. Cl.
*H04M 3/42* (2006.01)
*H04M 3/523* (2006.01)
*G06Q 20/10* (2012.01)
*H04M 7/12* (2006.01)

(52) U.S. Cl.
CPC ........... *H04M 3/5232* (2013.01); *G06Q 20/108* (2013.01); *H04M 7/12* (2013.01); *H04M 2207/18* (2013.01); *H04M 3/5233* (2013.01); *G06Q 20/10* (2013.01)
USPC ................................. 379/201.06; 379/211.01

(58) Field of Classification Search
USPC ............ 379/201.06–201.09, 211.01; 370/389
See application file for complete search history.

(56) References Cited

U.S. PATENT DOCUMENTS

| 4,680,785 A | 7/1987 | Akiyama et al. |
| 4,692,601 A | 9/1987 | Nakano |
| 5,822,418 A | 10/1998 | Yacenda et al. |
| 6,192,116 B1 | 2/2001 | Mayak |
| 6,400,808 B1 | 6/2002 | Burg |
| 6,449,356 B1 | 9/2002 | Dezonno |
| 6,553,113 B1 | 4/2003 | Dhir et al. |
| 6,675,008 B1 | 1/2004 | Paik et al. |

(Continued)

FOREIGN PATENT DOCUMENTS

GB EP 0 982954 * 8/1999

OTHER PUBLICATIONS

Renshaw, T., "nTag—You're it," Financial Post, Feb. 2, 2004, 1 page.

(Continued)

*Primary Examiner* — Quynh Nguyen
(74) *Attorney, Agent, or Firm* — Christopher & Weisberg, P.A.

(57) ABSTRACT

According to one aspect of the invention, there is provided a method of allocating calls coming into a call center from a caller location remote from the call center, receiving a call from a caller which includes information from an RFID chip located in close proximity to the caller location; decoding the information from the RFID chip to determine one or more parameters relating to the information; using said one or more parameters to allocate the call from the caller at the call center to ensure calls are handled in accordance with the parameters. This has the advantage of much more efficient management of the of the calls within the call center and ensures that the calls are sent to the agent with the most appropriate skill set.

9 Claims, 5 Drawing Sheets

(56) References Cited

U.S. PATENT DOCUMENTS

| | | | |
|---|---|---|---|
| 6,700,972 | B1 | 3/2004 | McHugh et al. |
| 6,757,732 | B1 | 6/2004 | Sollee et al. |
| 6,798,876 | B1 | 9/2004 | Bala |
| 6,819,753 | B1 | 11/2004 | Verkruijssen |
| 6,826,194 | B1 | 11/2004 | Vered et al. |
| 6,832,203 | B1 | 12/2004 | Villena et al. |
| 6,882,863 | B2 | 4/2005 | Hansson |
| 6,977,993 | B2 | 12/2005 | Starbuck et al. |
| 7,248,677 | B2 | 7/2007 | Randall et al. |
| 7,536,002 | B1 | 5/2009 | Ma et al. |
| 7,623,643 | B2 | 11/2009 | Raghav et al. |
| 8,045,697 | B1 | 10/2011 | Martin |
| 2001/0046209 | A1* | 11/2001 | Glassman ............... 370/230 |
| 2002/0080941 | A1 | 6/2002 | Clapper |
| 2003/0032414 | A1 | 2/2003 | Melaku et al. |
| 2003/0035532 | A1 | 2/2003 | Ganesan et al. |
| 2003/0092432 | A1 | 5/2003 | Hwang |
| 2004/0042610 | A1 | 3/2004 | Arashi |
| 2004/0125940 | A1 | 7/2004 | Turcan et al. |
| 2005/0035192 | A1 | 2/2005 | Bonalle et al. |
| 2005/0129202 | A1 | 6/2005 | Creamer et al. |
| 2005/0193060 | A1 | 9/2005 | Barton |
| 2005/0201543 | A1* | 9/2005 | Light et al. ............ 379/201.01 |
| 2005/0242177 | A1 | 11/2005 | Roberge et al. |
| 2006/0008067 | A1* | 1/2006 | Shaffer et al. ........... 379/201.06 |
| 2006/0085297 | A1 | 4/2006 | Minerley |
| 2006/0107067 | A1 | 5/2006 | Safal et al. |
| 2008/0082421 | A1 | 4/2008 | Onyon et al. |

OTHER PUBLICATIONS

Wallace, R., "Silicon, Not Just Software, Key to Pervasive Media," EE Times, Jan. 14, 2004, 4 pages.

Yoshida, J., "Phillips, Visa Push Contactless Payments in Consumer Devices," EE Times, Jan. 12, 2004, 2 pages.

Larin Rfid, "A Basic Introduction to RFID Technology and its Use in the Supply Chain," White Paper, Jan. 2004, 30 pages.

Non-Final Office Action for U.S. Appl. No. 13/474,210, mailed Dec. 26, 2013, 9 pages.

Examiner's Answer for U.S. Appl. No. 13/252,595, mailed Dec. 18, 2013, 11 pages.

Final Office Action for U.S. Appl. No. 13/252,595, mailed Jun. 4, 2013, 10 pages.

Non-final Office Action for U.S. Appl. No. 13/252,595, mailed Feb. 7, 2013, 7 pages.

Non-final Office Action for U.S. Appl. No. 13/252,595, mailed Sep. 21, 2012, 7 pages.

Notice of Allowance for U.S. Appl. No. 10/858,979, mailed Jun. 21, 2011, 5 pages.

Non-final Office Action for U.S. Appl. No. 10/858,979, mailed Mar. 2, 2011, 5 pages.

Panel Decision on Pre-Appeal Brief for U.S. Appl. No. 10/858,979, mailed Jan. 13, 2011, 2 pages.

Final Office Action for U.S. Appl. No. 10/858,979, mailed Jul. 16, 2010, 9 pages.

Non-final Office Action for U.S. Appl. No. 10/858,979, mailed Feb. 29, 2008, 13 pages.

Notice of Allowance for U.S. Appl. No. 13/474,210, mailed Apr. 29, 2014, 5 pages.

Non-Final Office Action for U.S. Appl. No. 10/994,542, mailed Jul. 25, 2008, 9 pages.

Final Rejection for U.S. Appl. No. 10/994,542, mailed Dec. 24, 2008, 10 pages.

Non-Final Office Action for U.S. Appl. No. 10/994,542, mailed Oct. 9, 2009, 11 pages.

Notice of Allowance for U.S. Appl. No. 10/994,542, mailed Mar. 9, 2010, 7 pages.

Non-Final Office Action for U.S. Appl. No. 12/784,596, mailed Nov. 8, 2011, 5 pages.

Notice of Allowance for U.S. Appl. No. 12/784,596, mailed Feb. 13, 2012, 8 pages.

Non-Final Office Action for U.S. Appl. No. 13/475,480, mailed Dec. 27, 2012, 9 pages.

Non-Final Office Action for U.S. Appl. No. 13/475,480, mailed Apr. 26, 2013, 18 pages.

Final Rejection for U.S. Appl. No. 13/475,480, mailed Sep. 3, 2013, 21 pages.

Non-Final Office Action for U.S. Appl. No. 13/475,480, mailed Feb. 6, 2014, 6 pages.

Notice of Allowance for U.S. Appl. No. 13/475,480, mailed Jun. 23, 2014, 6 pages.

* cited by examiner

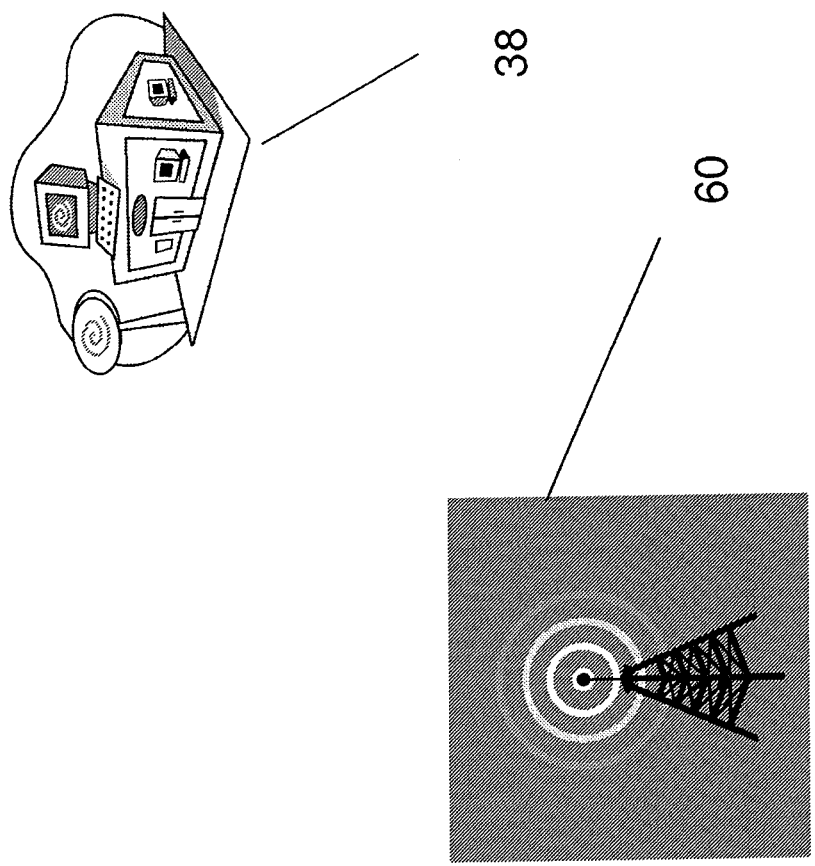
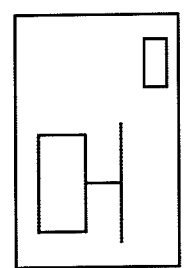
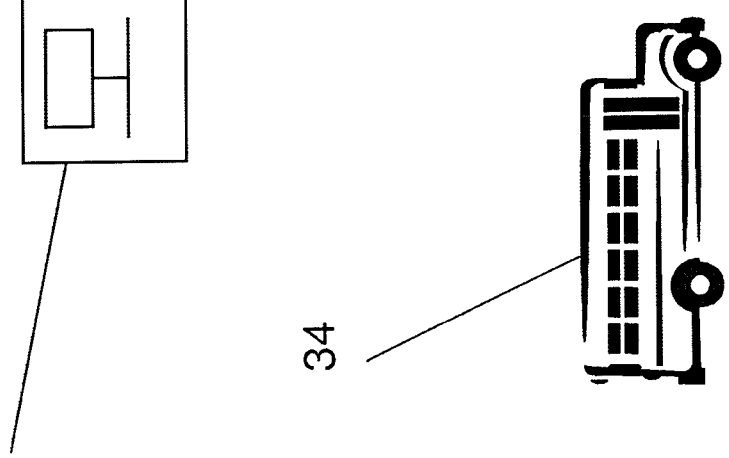
Fig. 5

CALL PRIORITIZATION METHODS IN A CALL CENTER

RELATED APPLICATION

This application is a continuation of co-pending U.S. patent application Ser. No. 11/577,472, filed Jul. 2, 2007, which is a the national filing of international application No. PCT/EP2005/055379 filed Oct. 19, 2005.

The present invention relates to a call center or similar system and particularly to improvements relating to call prioritisation methods.

A call center receives many calls relating to many products, services or other enquiries. Prioritisation and management of the incoming calls is always a major consideration in any such system. It is also important that calls are routed to call agents who are best suited to answer particular queries.

There are many known methods of prioritising calls which will be well known to the person skilled in the art. These include:—
  prioritising calls in order of arrival;
  prioritising calls dependent on number called for call center;
  prioritising calls dependent on customer inputs to an interactive voice response (IVR) system etc.

With all these types of means of prioritising the call it is often difficult to identify the best priority for calls as the information available at the call center is to some degree quite limited. There is insufficient "granularity" in the data being analysed to make an accurate determination of which call is most important and/or most likely to result in a sale.

For example, if a call center is involved in selling products it would be useful to know whether the customer is really interested in a purchase or has merely called with an enquiry.

In addition, if an incoming call is routed to an agent that knows nothing about the product or enquiry being made, then there can be delays for both the customer and the call center, whilst appropriately skilled agents are located and connected to the customer.

One object of the present invention is intended to improve the amount and value of information which is received at a call center which enables improved prioritisation and appropriate routing of the call.

Another object of the present invention is to overcome at least some of the problem of call prioritisation and routing at a call center.

According to one aspect of the invention, there is provided a method of allocating calls coming into a call center from a caller location remote from the call center, receiving a call from a caller which includes information from an RFID (Radio Frequency Identification) chip located in close proximity to the caller location; decoding the information from the RFID chip to determine one or more parameters relating to the information; using said one or more parameters to allocate the call from the caller at the call center to ensure calls are handled in accordance with the parameters.

This has the advantage of much more efficient management of the of the calls within the call center and ensures that the calls are sent to the agent with the most appropriate skill set.

Preferably the step of decoding the information comprises:—determining a plurality of message sections for each message, wherein each section is representative of the one or more parameters which are used to allocate the call; selecting a allocation parameter on which the call is to be allocated; reading that message section which corresponds with that allocation parameter; and allocating and queuing the call in accordance with the allocation parameter.

Advantageously the step of determining a plurality of message sections includes determining more than three message sections and selecting the message sections to be representative of one or each of the parameters comprising:—location information; caller information; telephone information; product information; customer information; and price information; call agent information.

The call may be received in one or more of the following forms:—voice; data; email; short message service (SMS); text; code.

The step of the caller receiving the RFID chip information may receive the information from an RFID chip using any RFID chip reader associated with a device being used to make the call.

The step of connecting the call may include connecting to a call agent terminal dependent on the allocation parameters of the call when compared with those of any other pending calls.

According to a second aspect of the present invention there is provided apparatus for allocating calls coming into a call center from a caller location remote from the call center, comprising:—a receiver for receiving a call from a caller which includes information from an RFID chip located in close proximity of the caller location; a decoder for decoding information from the RFID chip to determining one or more parameters relating to the information; routing and prioritising means for routing and allocating the call in accordance with the priority determined from the decoder.

According to an additional element of the invention there is provide means for reprogramming an RFID chip to change the information therein, comprising:—a transmitter which can communicate with the RFID chip and which transmitter can transmit a signal to the RFID chip in order to reprogram some or all of the information therein.

According to another aspect of the present invention there is provided a computer program embodied on a computer readable medium and capable or being executed by a processor, the computer program comprising computer readable program code for: allocating calls coming into a call center from a caller location remote from the call center, by receiving a call from a caller which includes information from an RFID chip located in close proximity to the caller location; decoding the information from the RFID chip to determine one or more parameters relating to the information; using said one or more parameters to allocate the handling of the call from the caller at the call center.

According to another aspect of the present invention there is provided an RFID chip programmed with information that can be read by an RFID chip reader associated with a communications device wherein when the communication device communicates with a call center the information from the RFID chip is transmitted thereto to enable the call center to allocate the call in accordance with indications of parameters included in the information from the RFID chip.

According to another aspect of the present invention there is provided an RFID reader associated with a communications device which is able to read an RFID chip containing information at a location and in conjunction with the communications device transmitting said information to a call center where the information is used to determine allocation parameters included within the information so as to allocate a call made from the communications device to the call center in accordance therewith.

According to another aspect of the present invention there is provided a method of reprogramming information on an RFID chip at a remote location comprising:—transmitting to an antenna in proximity to the remote location updated information to be programmed into the RFID chip using the antenna to wirelessly download the updated information to the RFID chip; and rewriting the RFID chip with the updated information.

Reference will now be made by way of example to the accompanying drawings, in which:—

FIG. 5 is a block diagram showing a second embodiment of the present invention.

Figure 1:
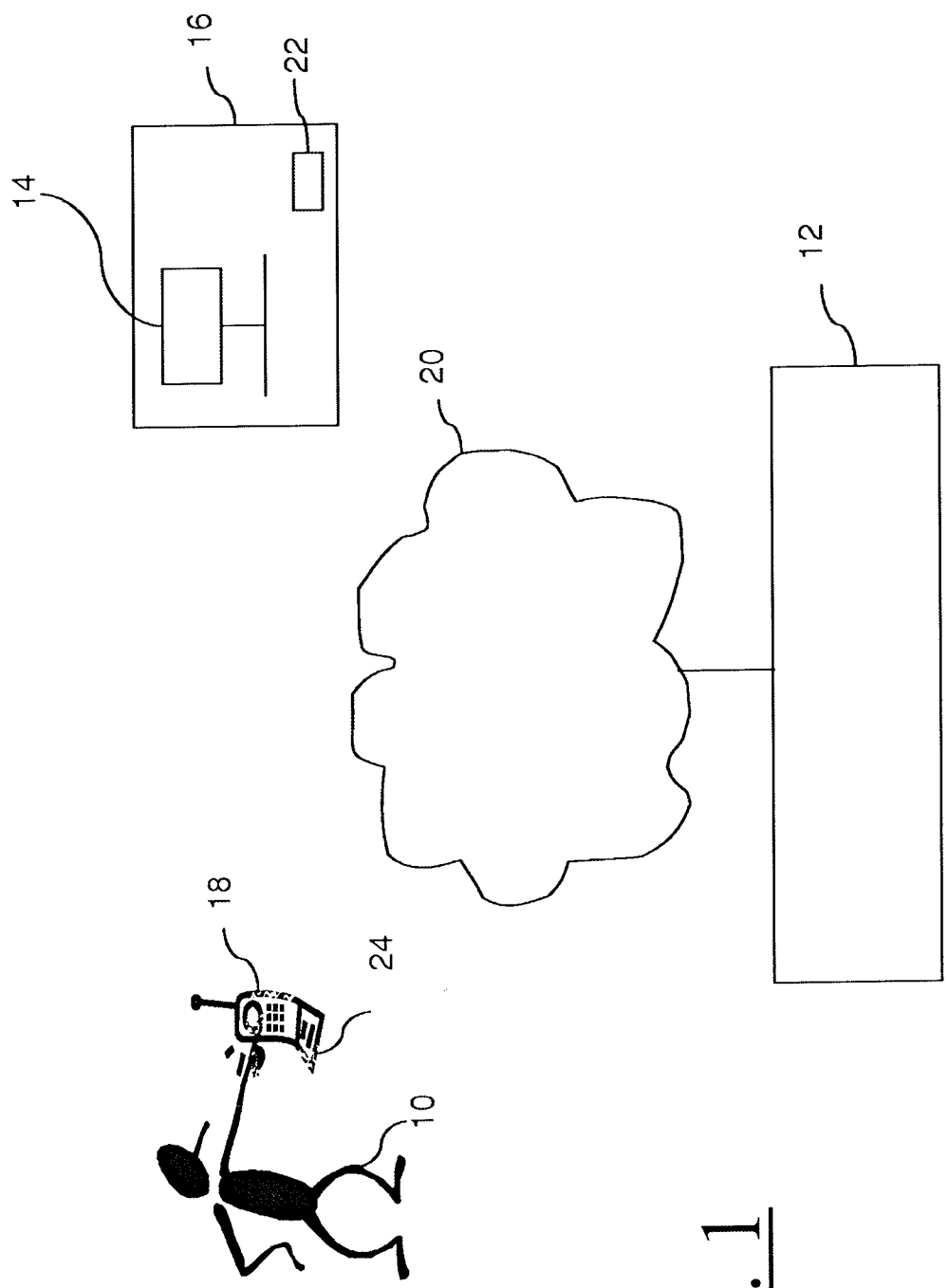
FIG. 1 is a block diagram showing how a caller interacts with a call center according to the present invention.

Referring initially to FIG. 1, a customer 10 decides to call a call center 12 in order to buy a product 14. The product may be advertised on an advertisement 16. The customer calls the call center using a mobile phone 18. The call is connected to the call center via a network 20.

Figure 2:
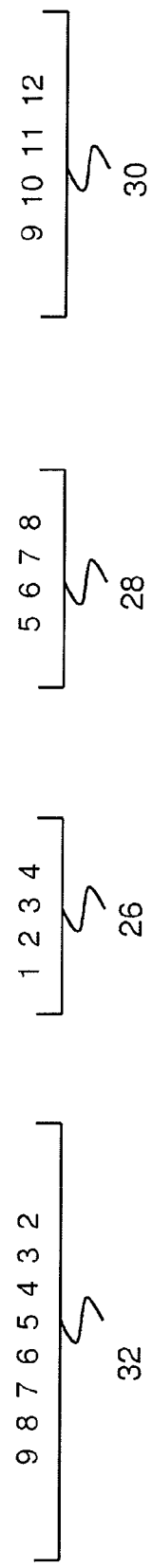
FIG. 2 is a representation of an example of an RFID number sequence.

The advertisement includes a Radio Frequency Identification chip (RFID chip) 22. The RFID chip 22 is programmed with a number sequence each numeral or set of numerals of which are indicative or a particular parameter. For example, referring to FIG. 2, there may be numerals representing the product on the advertisement 26; the location of the advertisement 28 (a hoarding or on a counter selling the product, for example); a priority indicator 30; a destination address 32 or any other information which might be useful for a call center (not shown) to enable a call to be prioritised and routed to an appropriately skilled agent. The RFID chip may include some or all of the above mentioned information depending on what the product seller's specific requirements are.

If the seller is not interested in knowing the location of the caller the location numerals will be not programmed and it may be possible have a number of RFID chips with the same programmed sequence of numbers. If location is important it is likely that each RFID chip will be programmed with a unique sequence of numbers, or that several chips are programmed with the same numbers if they are going to be in equivalent locations.

The mobile telephone is equipped with an RFID chip reader 24 so that the customer may read the RFID chip information from the advertisement. The reader 24 may automatically determine the destination address 32 from the RFID sequence of numbers so that a call can be made to the call center either automatically or in response to the customer. Once the call has been made the sequence of numbers is transmitted via the network to the call center. Details of how the number sequence is used in prioritising the call will be described in greater detail below.

The mobile phone is one example of a device to which the RFID reader may be connected and used to complete a connection with a contact center. It will, however, be apparent that any other communications device, e.g. a PDA, a computer or any device which is capable of transmitting a message to the call center. The message may be transmitted wirelessly, via the internet, via a traditional phone network, by text etc.

The RFID reader may be an integral part of the transmitter or may be an "add on" thereto.

Figure 3:
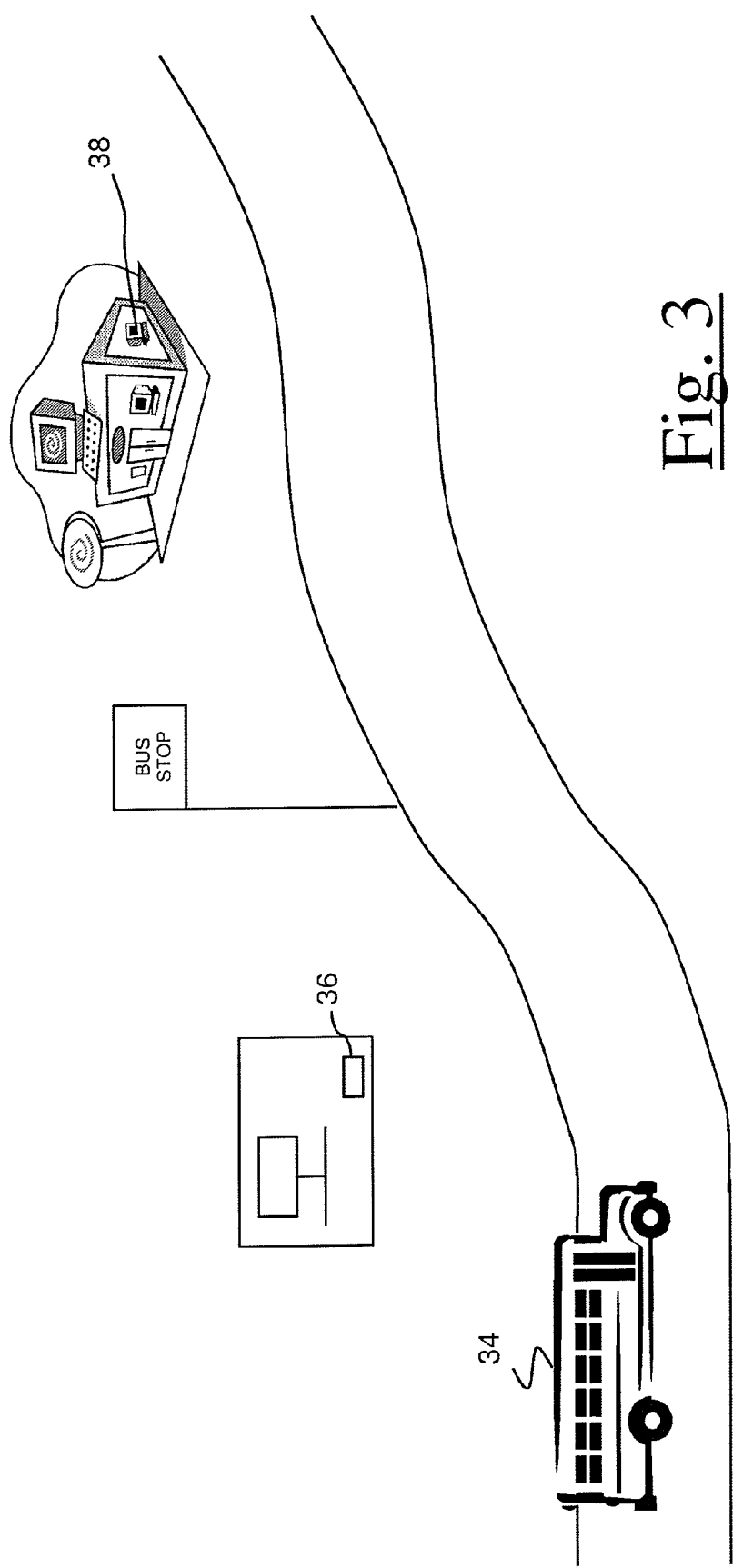
FIG. 3 is a diagram showing a number of locations from which customers may call the call center of FIG. 1.

Referring now to FIG. 3, three types of location for an RFID chip are shown where a customer might contemplate phoning (or otherwise contacting) a contact center to make a purchase or an enquiry. The first RFID chip 34 is located in a magazine on a bus. The second RFID chip 36 is located on advertising hoarding by a bus stop. The third RFID chip 38 is located within a store where purchases may be made or collected.

Three users or customers are located at each of the locations where the respective RFID chips 34, 36 and 38 are located. The locations of 34, 36 and 38 would normally be in the same location if location was determined if a normal wireless or mobile communication were made to a call center. These three locations would all seem to be the same location in the prior art systems. However, since each RFID chip is located on a different medium namely a magazine, a hoarding and a counter, each will have a different identity. The identity will be indicative of the location on which the RFID chip is found. This may be indicated through the priority indicator 30 of FIG. 2 or possibly the location indicator 28 of FIG. 2. Also, there could be a serial number in the RFID so a determination can be made as to whether the call is pre or post sales.

The customer at each of the three locations decides they would want to enquire about the product being advertised. The person on the bus wants to know the price, the person at the hoarding wants to know the location of the shop and the person at the shop wants to know the best finance deal that they can have. The users each make a call to the call center. Since it is unlikely that a customer reading a magazine or at an advertising hoarding is likely to be purchasing a product, the priority indicator or location indicator of the customer at the shop has a higher priority or location indicator than that of the other customers. Accordingly, once the call center has received the call from the three callers, the person at location 38 will be given a higher priority than the people at location 36 and 34. This will mean that the person at location 38 will be answered quicker than the other two people. Similarly, the person at the advertising hoarding close to the shop might have a greater likelihood of making a purchase than the person reading a magazine. Accordingly, the person closest to location 36 would be given the second priority of the three callers. The person reading the magazine will be given the third priority.

In addition details of the product, priority, location, etc. are also used at the call center to ensure that each call is routed to the best available call agent with respect to the product being called about. This will ensure that if there an expert on a particular issue or product where possible calls will be routed to this expert.

Obviously the circumstances in which the RFID chips are located will govern the determination of which location or other parameter on the RFID chip is the highest priority for call server agents to handle and the specific agent to which the call is allocated. As would be appreciated the parameters could include price of the product, special locations where priorities are given, specific customers who are known to have a high spending capability and habit, or any other possible criteria that a manufacturer or seller would consider important in order to relatively prioritise the calls coming into the call center, or select a specific call agent.

Figure 4:
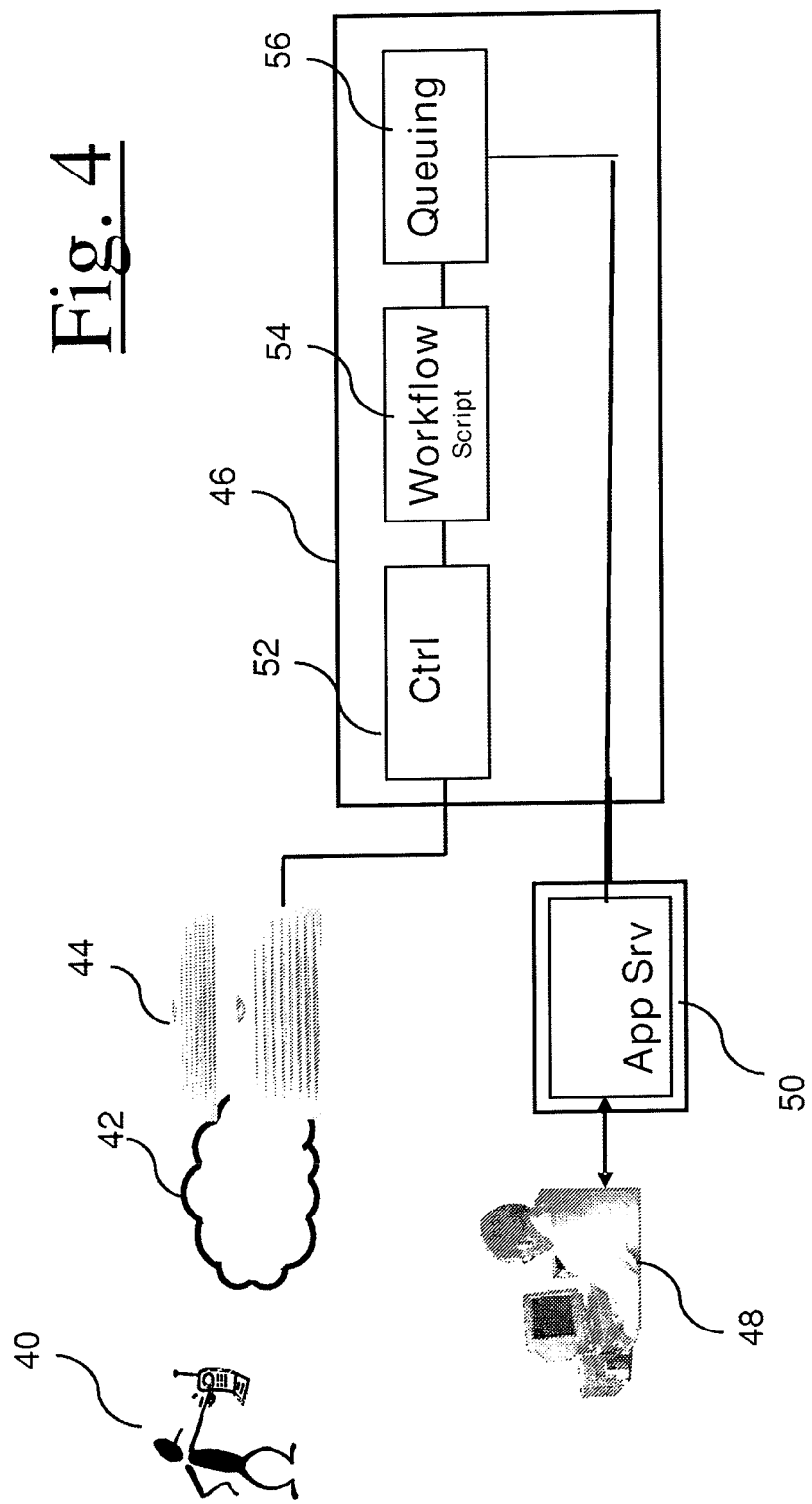
FIG. 4 is a detailed diagram of the call center of FIG. 1 for describing how data is processed.

Referring now to FIG. 4. A caller 40 makes a call on say a mobile phone. Connection is made via the network port 42 to a receiver or other like device 44 at the call center. Information relating to the call is then passed to a module 46 which processes the information received from caller 40. After processing the call is sent via an application server 50 to a call agent or supervisor 48. The call is processed by first entering the call details into the controller 52. The controller will decode the RFID chip information in order to determine where the call has been made from with respect to what goods it is being made and any other necessary information.

The controller will be able to process SMS messages, text messages of other formats, emails, telephone messages and any other type of media including IP and traditional generated signals. The controller will determine the priority of the caller relative to other calls in the workflow script and will be able to identify the call agents which have the best skills to deal with the product or issue in question. In relation to this prioritisation of the call and the details of the best agent's status the incoming call may be pushed higher up or lower down the workflow script depending on the priority indicator, location indicator, call agent availability or whatever it is that the call center is seeking to prioritise and rout calls under. This will cause an amendment to the workflow 54 which will put the incoming call in a relevant location in that workflow script and where there is a need to be allocated to the best agent to deal with that product or issue.

Amendment of the workflow script will cause queuing 56 to be updated such that the calls are routed to specific agents in a specific priority in the normal way.

The RFID data will immediately indicate the type of agent required to handle the call. If there is a product it will an agent familiar with and well versed in that product. If there are two posters: one for the Samaritans and one for Army Recruitment an appropriately skilled agent would be selected by the controller.

Referring now to FIG. 5 in an additional embodiment of the invention it may be possible to provide the RFID chips in the relevant locations to be reprogrammable. This ability to reprogram the RFID chip would give the opportunity for manufacturers, advertisers, call center management etc to change the parameters or some of the parameters on an RFID chip at different times.

For example, at night time there may be an indicator to route the call to a call center which is open rather than a call center which is closed and this feature may be used to advise the locations of longest idle agents or appropriate and free agents for a specific type of enquiry.

The reprogramming of the RFID chips 34, 36, and 38 is achieved by exciting the chip with radio waves from an antenna 60 located close to the RFID chip. The frequency of reprogramming can be increased to as high a rate as is permitted by the radio infrastructure. The radio waves are transmitted to the RFID chip via a standard mobile cell aerial or antenna. Alternatively a specifically located radio wave transmitter (not shown) close to one or more RFID chips may be excited and cause the RFID chip to be reprogrammed. The reprogrammable RFID chips may be reprogrammed dependent on time of day, dependent on where the longest idle agents are at say a number of call centers or the time at which such a call may be handled in the call centre or may be dependent on product availability and product movement. The RFID chips could also be reprogrammable after sale of a product.

It will be understood that the above description of a preferred embodiment is given by way of example only and that various modifications may be made by those skilled in the art without departing from the spirit and scope of the invention.

What is claimed is:

1. A method of interfacing a customer with an information service, the method comprising:
    receiving a request for a communication session from a customer terminal;
    receiving information read from at least one information storage element by the customer terminal, the at least one information storage element being external to the customer terminal, the information identifying a subject of interest to the customer, a location and a type of the location of each of the at least one information storage element; and
    routing the communication session within the information service based, at least in part, on the location and the type of the location of the at least one information storage element.

2. The method of claim 1, wherein receiving information read from at least one information storage element by the customer terminal comprises receiving information read by detecting an electromagnetic signal over a wireless medium.

3. The method of claim 2, wherein detecting an electromagnetic signal comprises reading at least one electronic tag.

4. The method of claim 3, wherein reading at least one electronic tag comprises reading an RFID tag.

5. The method of claim 1, wherein the information identifies a commercial offering, and the at least one information storage element is located in close proximity to an advertisement of the commercial offering.

6. The method of claim 1, wherein the customer terminal is a mobile telephone.

7. The method of claim 1, wherein the customer terminal is configured to read the information by detecting an electromagnetic signal over a wireless medium.

8. The method of claim 1, wherein the information service comprises a contact center configured to establish the communication session between the customer and an agent.

9. The method of claim 1, wherein the information service comprises a call center configured to establish a voice call between the customer and an agent.

* * * * *